(12) United States Patent
Boutros et al.

(10) Patent No.: US 11,516,112 B2
(45) Date of Patent: Nov. 29, 2022

(54) OPTIMIZED LAYER 3 VPN CONTROL PLANE USING SEGMENT ROUTING

(71) Applicant: Ciena Corporation, Hanover, MD (US)

(72) Inventors: Sami Boutros, Union City, CA (US); Muthurajah Sivabalan, Kanata (CA); Pranav Mehta, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 44 days.

(21) Appl. No.: 17/075,186

(22) Filed: Oct. 20, 2020

(65) Prior Publication Data
US 2022/0124019 A1  Apr. 21, 2022

(51) Int. Cl.
*H04L 45/02* (2022.01)
*H04L 45/74* (2022.01)
*H04L 12/46* (2006.01)

(52) U.S. Cl.
CPC .............. *H04L 45/02* (2013.01); *H04L 45/74* (2013.01); *H04L 12/4641* (2013.01)

(58) Field of Classification Search
None
See application file for complete search history.

(56) References Cited

U.S. PATENT DOCUMENTS

| | | |
|---|---|---|
| 8,295,278 B2 | 10/2012 | Shah et al. |
| 8,948,055 B2 | 2/2015 | Bragg |
| 9,531,627 B1 | 12/2016 | Alvarez et al. |
| 9,538,423 B2 | 1/2017 | Alvarez et al. |
| 9,596,167 B1 * | 3/2017 | Jacob ...................... H04L 45/50 |
| 9,647,941 B2 * | 5/2017 | Sun ........................ H04L 45/748 |
| 9,979,629 B2 | 5/2018 | Sivabalan et al. |
| 10,033,539 B1 * | 7/2018 | Nagarajan ............... H04L 45/16 |
| 10,069,639 B2 | 9/2018 | Bragg et al. |
| 10,153,948 B2 | 12/2018 | Ong |
| 10,250,494 B2 | 4/2019 | Sivabalan et al. |
| 10,250,552 B1 * | 4/2019 | Sajassi ................ H04L 41/0663 |
| 10,887,225 B1 * | 1/2021 | Chan ..................... H04L 45/507 |

(Continued)

OTHER PUBLICATIONS

C. Filsfils et al., Spring Internet—Draft, Standards Track, Expires: Aug. 28, 2020, Network Programming extension: SRv6 uSID instruction draft-filsfils-spring-net-pgm-extension-srv6-usid-04, Feb. 25, 2020, pp. 1-14.

(Continued)

*Primary Examiner* — Lonnie V Sweet
(74) *Attorney, Agent, or Firm* — Clements Bernard Baratta; Lawrence A. Baratta, Jr.; Christopher L. Bernard (57) ABSTRACT

Systems and methods include determining one or more Layer 3 Virtual Private Networks (L3VPNs) supported at the router; and advertising the one or more L3 VPNs to one or more routers in the Segment Routing network with each advertisement including a service Segment Identifier (SID) for each of the one or more L3VPNs and one of a node SID for the router or an Anycast SID when the router is connected to a Multi-Home site. The steps can further include transmitting a Layer 3 (L3) packet for an L3 VPN of the one or more L3 VPNs with a destination SID and a service SID of the L3VPN. The advertisement can include encapsulation as an IPv6 prefix containing both the node SID for the router and the service SID, and wherein prefixes are treated as attributes of a route.

20 Claims, 4 Drawing Sheets

(56) References Cited

U.S. PATENT DOCUMENTS

| | | | |
|---|---|---|---|
| 2003/0236793 A1* | 12/2003 | Karlsson | G06F 16/9027 |
| 2005/0089015 A1* | 4/2005 | Tsuge | H04L 45/04 |
| | | | 370/351 |
| 2005/0100012 A1* | 5/2005 | Kaxiras | H04L 45/742 |
| | | | 370/389 |
| 2007/0058638 A1* | 3/2007 | Guichard | H04L 12/4641 |
| | | | 370/395.31 |
| 2010/0214932 A1* | 8/2010 | Qian | H04L 45/46 |
| | | | 370/252 |
| 2013/0031077 A1* | 1/2013 | Liu | G06F 7/02 |
| | | | 707/706 |
| 2013/0343175 A1* | 12/2013 | Kini | H04L 45/74 |
| | | | 370/219 |
| 2015/0288602 A1 | 10/2015 | Bragg et al. | |
| 2016/0380886 A1 | 12/2016 | Blair et al. | |
| 2018/0006995 A1* | 1/2018 | Bickhart | H04L 61/103 |
| 2018/0083871 A1* | 3/2018 | Filsfils | H04L 45/02 |
| 2018/0324090 A1 | 11/2018 | Duncan et al. | |
| 2018/0375968 A1 | 12/2018 | Bashandy et al. | |
| 2019/0132221 A1 | 5/2019 | Boutros et al. | |
| 2019/0245787 A1 | 8/2019 | Skalecki et al. | |
| 2020/0099775 A1* | 3/2020 | Brissette | H04L 45/04 |
| 2020/0127913 A1* | 4/2020 | Filsfils | H04L 45/04 |
| 2020/0295969 A1* | 9/2020 | Wang | H04L 63/0227 |
| 2020/0296025 A1* | 9/2020 | Wang | H04L 12/4633 |
| 2020/0396159 A1* | 12/2020 | Rao | H04L 12/66 |
| 2020/0403861 A1* | 12/2020 | Saad | H04L 61/5007 |
| 2020/0403902 A1* | 12/2020 | Saad | H04L 45/302 |
| 2021/0029022 A1* | 1/2021 | Hu | H04L 45/12 |
| 2021/0091973 A1* | 3/2021 | Gwun | H04L 12/4641 |
| 2021/0092048 A1* | 3/2021 | Dutta | H04L 45/22 |
| 2021/0160101 A1* | 5/2021 | Semwal | H04L 49/3009 |
| 2021/0243111 A1* | 8/2021 | Dutta | H04L 12/08 |
| 2021/0258249 A1* | 8/2021 | Torvi | H04L 45/04 |
| 2022/0029915 A1* | 1/2022 | Moreno | H04L 12/4641 |

OTHER PUBLICATIONS

C. Filsfils et al., Spring Internet—Draft, Standards Track, Expires: Aug. 26, 2020, SRv6 Network Programming draft-ietf-spring-srv6-network-programming-10, Feb. 23, 2020, pp. 1-38.

A. Sajassi et al., Internet Engineering Task Force (IETF), Category: Informational, ISSN: 2070-1721, Requirements for Ethernet VPN (EVPN), May 2014, pp. 1-15.

A. Sajassi et al., Internet Engineering Task Force (IETF), Category: Standards Track, ISSN: 2070-1721, A Network Virtualization Overlay Solution Using Ethernet VPN (EVPN), Mar. 2018, pp. 1-33.

J. Rabadan et al., Internet Engineering Task Force (IETF), Category: Standards Track, ISSN: 2070-1721, Framework for Ethernet VPN Designated Forwarder Election Extensibility, Apr. 2019, pp. 1-32.

Aug. 19, 2021, International Search Report and Written Opinion for International Patent Application No. PCT/US2021/031283.

* cited by examiner

OPTIMIZED LAYER 3 VPN CONTROL PLANE USING SEGMENT ROUTING

FIELD OF THE DISCLOSURE

The present disclosure generally relates to networking. More particularly, the present disclosure relates to systems and methods for an optimized Layer 3 Virtual Private Network (VPN) control plane using Segment Routing.

BACKGROUND OF THE DISCLOSURE

Border Gateway Protocol (BGP)/Multiprotocol Label Switching (MPLS) VPN is described, for example, in RFC 2547, "BGP/MPLS VPNs," March 1999, RFC2547bis, "BGP/MPLS IP VPNs," October 2004, available online at tools.ietforg/html/draft-ietf-13vpn-rfc2547bis-03, RFC 4364, "BGP/MPLS IP Virtual Private Networks (VPNs)," February 2006, and RFC 4577, "OSPF as the Provider/Customer Edge Protocol for BGP/MPLS IP Virtual Private Networks (VPNs)," June 2006, RFC 6368, "Internal BGP as the Provider/Customer Edge Protocol for BGP/MPLS IP Virtual Private Networks (VPNs)," September 2011, the contents of each are incorporated by reference in their entirety.

A BGP/MPLS VPN, i.e., a Layer 3 (L3) VPN (L3VPN), enables a service provider to use an Internet Protocol (IP) backbone to provide IP VPNs for customers. This approach uses a "peer model," in which the Customers' Edge (CE) routers send their routes to the Service Provider's Edge (PE) routers. BGP is then used by the service provider to exchange the routes of a particular VPN among the PE routers that are attached to that VPN. This is done in a way that ensures that routes from different VPNs remain distinct and separate, even if two VPNs have an overlapping address space. The PE routers distribute, to the CE routers in a particular VPN, the routes from other the CE routers in that VPN. The CE routers do not peer with each other; hence there is no "overlay" visible to the VPN's routing algorithm.

Disadvantageously, conventional L3VPNs require a significant control plane in terms of traffic, overhead, and operational complexity. Existing L3VPN mechanisms suffer from scale concerns as the number of VPN routes increases in the service provider network. Each L3VPN route (v4/v6) advertisement is prepended with an 8-byte Route Distinguisher (RD) to allow the IP address space to be reused by multiple VPNs. Each L3VPN route is associated with a set of extended communities, i.e., Route Targets (RTs). Each L3VPN route can be associated with other attributes such as local preferences, MED (Multi_EXIT_DISC attribute), color, etc. Each L3VPN route is associated with a tunnel encapsulation, i.e., MPLS label.

BRIEF SUMMARY OF THE DISCLOSURE

The present disclosure relates to systems and methods for an optimized Layer 3 Virtual Private Network (VPN) control plane using Segment Routing, i.e., SR-optimized L3VPN. The present disclosure maintains the existing L3VPN semantics to (1) allow overlapping IP addresses to be used across multiple VPNs and (2) associate routes with attributes. Further, the present disclosure allows service providers to represent an L3VPN instance by one or more globally allocated service Segment Identifiers (SID(s)). The VPN route import/export is governed by the SID and allows the operator to deploy extranet, hub-and-spoke, and mesh VPN topologies. Route Target (RT)-based import/export can also be used to support non-mesh L3VPN sites. Also, the present disclosure provides Active/Active (A/A) redundancy and multi-pathing using Segment Routing Anycast SIDs for Multi-Homed (MH) L3VPN sites. Advantageously, the proposed approach significantly reduces the BGP overhead for L3VPN control planes by at least two orders of magnitude and, in mesh deployments, by up to four orders of magnitude. At the same time, the proposed approach does not compromise the desired benefits of L3VPN and EVPN prefix advertisements (RT-5), such as support of multi-active redundancy on access, multi-pathing in the core, auto-provisioning and auto-discovery.

In various embodiments, the present disclosure includes a method implemented in in a Segment Routing network including steps, a router in a Segment Routing network configured to implement the steps, and a non-transitory computer-readable medium having instructions stored thereon for programming a router in a Segment Routing network to perform the steps. The steps include determining one or more Layer 3 Virtual Private Networks (L3VPNs) supported at the router; and advertising the one or more L3VPNs to one or more routers in the Segment Routing network with each advertisement including a service Segment Identifier (SID) for each of the one or more L3VPNs and one of a node SID for the router and an Anycast SID when the router is connected to a Multi-Home site.

The steps can further include transmitting a Layer 3 (L3) packet for an L3VPN of the one or more L3VPNs with a destination SID and a service SID of the L3VPN. The destination SID can be one of a node SID for a destination router and an Anycast SID when the destination router is connected to a Multi-Home site. The advertisement can include encapsulation as an Internet Protocol version 6 (IPv6) prefix containing both the node SID for the router and the service SID, and wherein prefixes are treated as attributes of a route. The advertising can be via Border Gateway Protocol (BGP). The advertisement can include up to 12,000 prefixes. The advertisement can include a plurality of L3VPN prefixes.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for an optimized Layer 3 Virtual Private Network (VPN) control plane using Segment Routing, i.e., SR-optimized L3VPN. The present disclosure maintains the existing L3VPN semantics to (1) allow overlapping IP addresses to be used across multiple VPNs and (2) associate routes with attributes. Further, the present disclosure allows service providers to represent an L3VPN instance by one or more globally allocated service Segment Identifiers (SID(s)). The VPN route import/export is governed by the SID and allows the operator to deploy extranet, hub-and-spoke, and mesh VPN topologies. RT-based import/export can also be used to support non-mesh L3VPN sites. Also, the present disclosure provides Active/Active (A/A) redundancy and multi-pathing using Segment Routing Anycast SIDs for Multi-Homed (MH) L3VPN sites. Advantageously, the proposed approach significantly reduces the BGP overhead for L3VPN control planes by at least two orders of magnitude and, in mesh deployments, by up to four orders of magnitude. At the same time, the proposed approach does not compromise the desired benefits of L3VPN and EVPN prefix advertisements (RT-5), such as support of multi-active redundancy on access, multi-pathing in the core, auto-provisioning and auto-discovery.

Acronyms

The following acronyms, abbreviations, and definitions are utilized herein:

A/A Active/Active; used synonymously with multi-active when a CE is multi-homed to two or more PEs
A/S Active/Standby
BGP Border Gateway Protocol
BGP PIC BGP Prefix Independent Convergence
CE Customer Edge
DP Data Plane
DF Designated Forwarder
ECMP Equal Cost Multi-Path
ES Ethernet Segment; when a CE is MH to PEs via a LAG, MH (PE) peers identify LAG interface as Ethernet Segment
IP Internet Protocol
L3 Layer 3
LAN Local Area Network
MED Multi_EXIT_DISC attribute
MH Multi-home
P2P Point-to-Point
PE Provider Edge
PW Pseudowire
RD Route Distinguisher
RT Route Target; L3VPN uses BGP RTs with import/export policy to form L3 VRF member group
SAFI Subsequent Address Family Identifiers
SH Split Horizon
SID Segment Identifier
SR Segment Routing
SRv6 Segment Routing over IPv6 data plane
SRGB Segment Routing Global Block
TLV Type-Length-Value
uSID Micro SID, SRv6 uSID
VLAN Virtual Local Area Network
VPN Virtual Private Network
VRF Virtual Routing and Forwarding Segment Routing Overview In loose source routing such as Segment Routing, a source node chooses a path and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments that are instructions a node executes on an incoming packet. For example, segments can include forward the packet according to the shortest path to the destination, forward through a specific interface, or deliver the packet to a given application/service instance). Each Segment is represented by a Segment Identifier (SID).

In SR-MPLS, all SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SR-MPLS, SRGB is a local property of a node and identifies the set of local labels reserved for global segments. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by ISIS or OSPF. The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by an adjacency SID, which represents a specific adjacency, such as egress interface, to a neighboring router. The adjacency SID is distributed by ISIS or OSPF. The adjacency segment steers the traffic to a specific adjacency.

An anycast segment is a type of prefix segment that represents an anycast group. An anycast segment/SID is used for policies or protection. When forwarding traffic to an anycast a node processing the forwarding will pick a device from the anycast group, which is the closest. If the closest device from the anycast group goes away, traffic will automatically switch to the next closest device in the anycast group.

SR-MPLS utilizes MPLS labels for the SID, whereas SRv6 utilizes an IPv6 address for a SID, i.e., when an SRv6 SID is in the Destination Address field of an IPv6 header of a packet, it is routed through an IPv6 network as an IPv6 address. Note, various example embodiments described herein are presented with reference to SR-MPLS, but those skilled in the art will recognize SRv6 is also contemplated.

A multicast SID represents a multicast segment that denotes the replication of the received packet. The implied interpretation of the Ethernet frame with multicast SID is that the received frame is of type BUM.

SR-Optimized L3VPN Service

Figure 1:
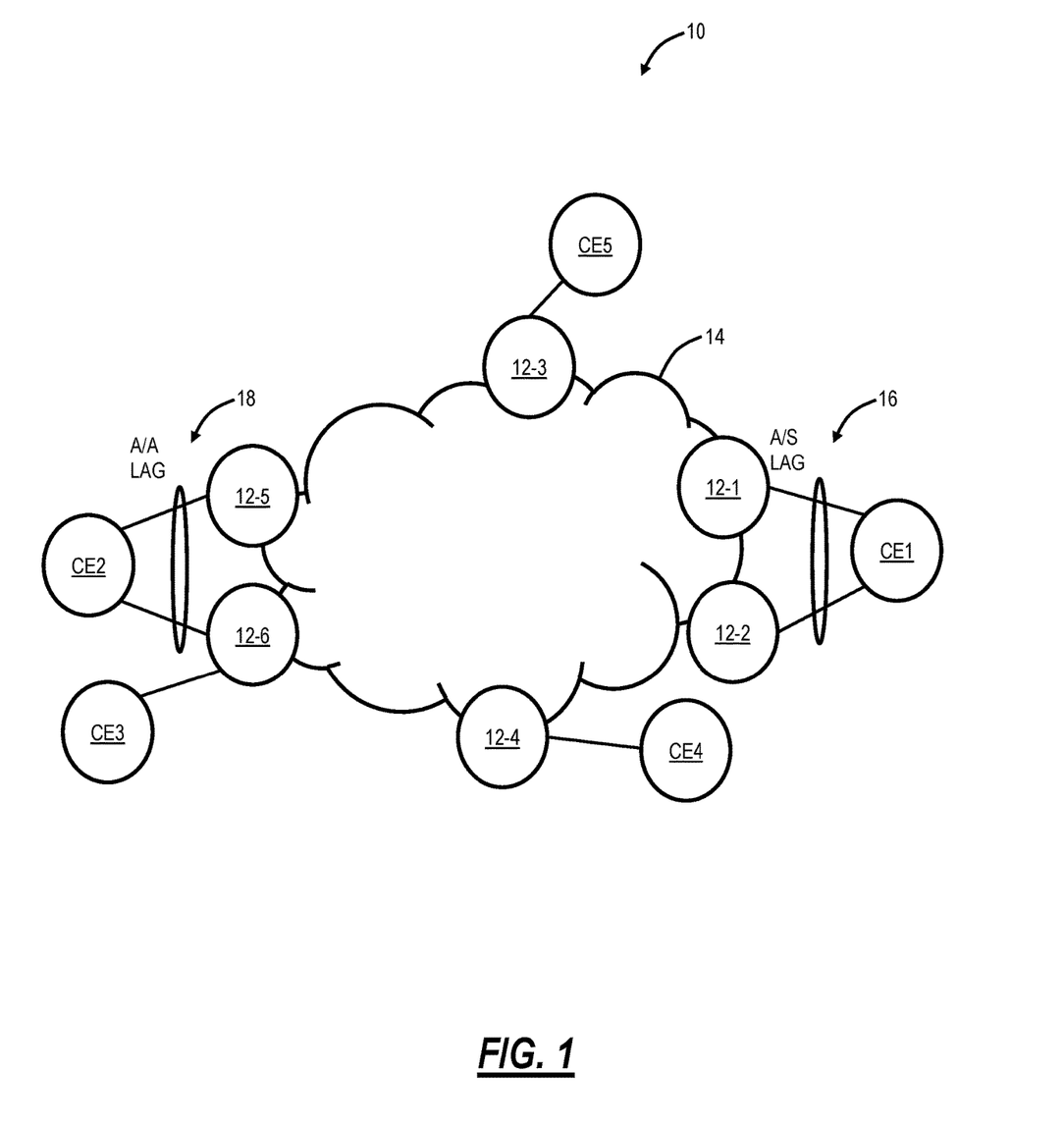
FIG. 1 is a network diagram of an example network including various nodes in a Segment Routing network as well as various Customer Edge (CE) nodes.

FIG. 1 is a network diagram of an example network 10, including various PE routers 12 (labeled as nodes 12-1-12-6)

in a Segment Routing network 14 as well as various Customer Edge (CE) routers (labeled CE1-CE5). The CE routers include a CE router CE2 in an Active/Active LAG 18, and a CE node CE1 in an Active/Standby LAG 16 configuration. Of note, those skilled in the art will recognize the network 10 is presented for illustration purposes, and various configurations are possible.

Again, the present disclosure includes SR-optimized L3VPN that maintains the existing L3VPN semantics to (1) allow overlapping IP addresses to be used across multiple VPNs, (2) to associate routes with attributes. The present disclosure allows service providers to represent an L3VPN instance by one or more globally allocated service SID(s). The VPN route import/export is governed by the SID and allows the service provider to deploy extranet, hub-and-spoke, and mesh VPN topologies. RT-based import/export can also be used to support non-mesh L3VPN sites. Also, the present disclosure provides Active/Active Redundancy and multi-pathing using Segment Routing Anycast SIDs for Multi-Homed (MH) L3VPN sites.

Again, the objective of using Segment Routing is to greatly reduce the BGP overhead of the L3VPN control plane by at least two orders of magnitude and, in mesh scenarios, by up to four orders of magnitude. This scheme does not compromise the desired benefits of L3VPN and EVPN prefix advertisements (RT-5), such as support of multi-active redundancy on access, multi-pathing in the core, auto-provisioning and auto-discovery.

The crux of the present disclosure is how the routes are advertised. All VPN routes originating from a PE router 12 share the same tunnel encapsulation (ENCAP) to that PE router 12. Thus, the present disclosure proposes to advertise the tunnel encapsulation as the unique route, and the VPN prefixes as the attributes of the route. A new BGP message will be used to advertise the route and attributes in the new format. The goal is to pack as many VPN prefixes as possible in a single BGP message. About 10 k VPNv4 prefixes can be packed in a 64 k message. With SRv6 and uSID, the ENCAP will be an IPv6 prefix that contains both the Node SID for the PE router 12 as well as the Service SID representing the VPN. In common cases, this will be a /64 globally unique prefix.

A node can discover L3VPN services instances as well as the associated service SIDs on other nodes via configuration or auto-discovery. With the latter, the service SIDs can be advertised using BGP. As mentioned earlier, the service SIDs can be MPLS label (absolute value or index into an SRGB) or SRv6 uSID.

VPNv4/v6 prefixes and operation type, i.e., to inform BGP neighbors whether prefixes are added or deleted, can be advertised in a new TLV. The prefixes will be packed efficiently; prefix length followed by prefixes sharing the same prefix length. With this format, at least 12 k VPNv4 prefixes can be encoded in the message. A single route will carry a large number of VPN prefixes (e.g., ~10 k VPNv4 prefixes), instead of advertising one route per each VPN prefix. In the case of VPNv4, this results in approximately four orders of magnitude reduction in BGP messages. L3VPN Service SIDs may be allocated from an SRGB range dedicated only for L3VPN services.

Each PE router 12 advertises, via IGP/BGP, (1) a regular Node SID to be used by the PE router 12 when an L3VPN service is attached to local Single-Home sites, and/or (2) an Anycast SID per Multi-Home site when an L3VPN service is attached to the Multi-Home (MH) site. For example, the PE routers 12-3, 12-4 could advertise a Node SID for an L3VPN associated with the CE 5, CE4, respectively. For MH, the PE routers 12-5, 12-6 can advertise an Anycast SID for an L3VPN associated with the CE2. With the use of anycast SID per MH site, shared by PEs attached to the site, there is no need to implement any BGP PIC techniques at the L3VPN layer, as the routing convergence relies on the underlay of SR. The Data plane can be MPLS or SRv6. That is, thanks to the SR anycast SID capability, the present disclosure inherent provides Active-Active multi-homing support.

An L3VPN instance is associated with a Service SID that is unique within the L3VPN domain. A node can advertise service SID(s) of the L3VPN instance(s) that it is associated with via BGP for auto-discovery purpose. In the case of SR-MPLS, a service SID can be carried as a range of absolute values or an index into an Segment Routing Global Block (SRGB), and in the case of SRv6, a service SID can be carried as uSID in BGP updates. The objective is to pack information about all L3VPN service instances supported (at the time of sending update) on a transmitting node in single BGP update so as to reduce the amount of overall BGP update messages in a network.

The proposed solution can also be applicable to EVPN control plane without compromising its benefits such as multi-active redundancy on access, multipathing in the core, auto-provisioning and auto-discovery, etc.

In the proposed approach, a L3VPN instance is represented by a SID regardless of the number of service termination points. A SID identifying a L3VPN instance (we call it L3VPN Service SID in the rest of the document) can be an: (1) MPLS label for SR-MPLS or (2) uSID (micro SID) for SRv6 representing network function associated with a VPLS instance. In the data packets, the service SID uniquely identify the L3VPN service in an SR domain.

Redundancy Using Anycast SID

Figure 2:
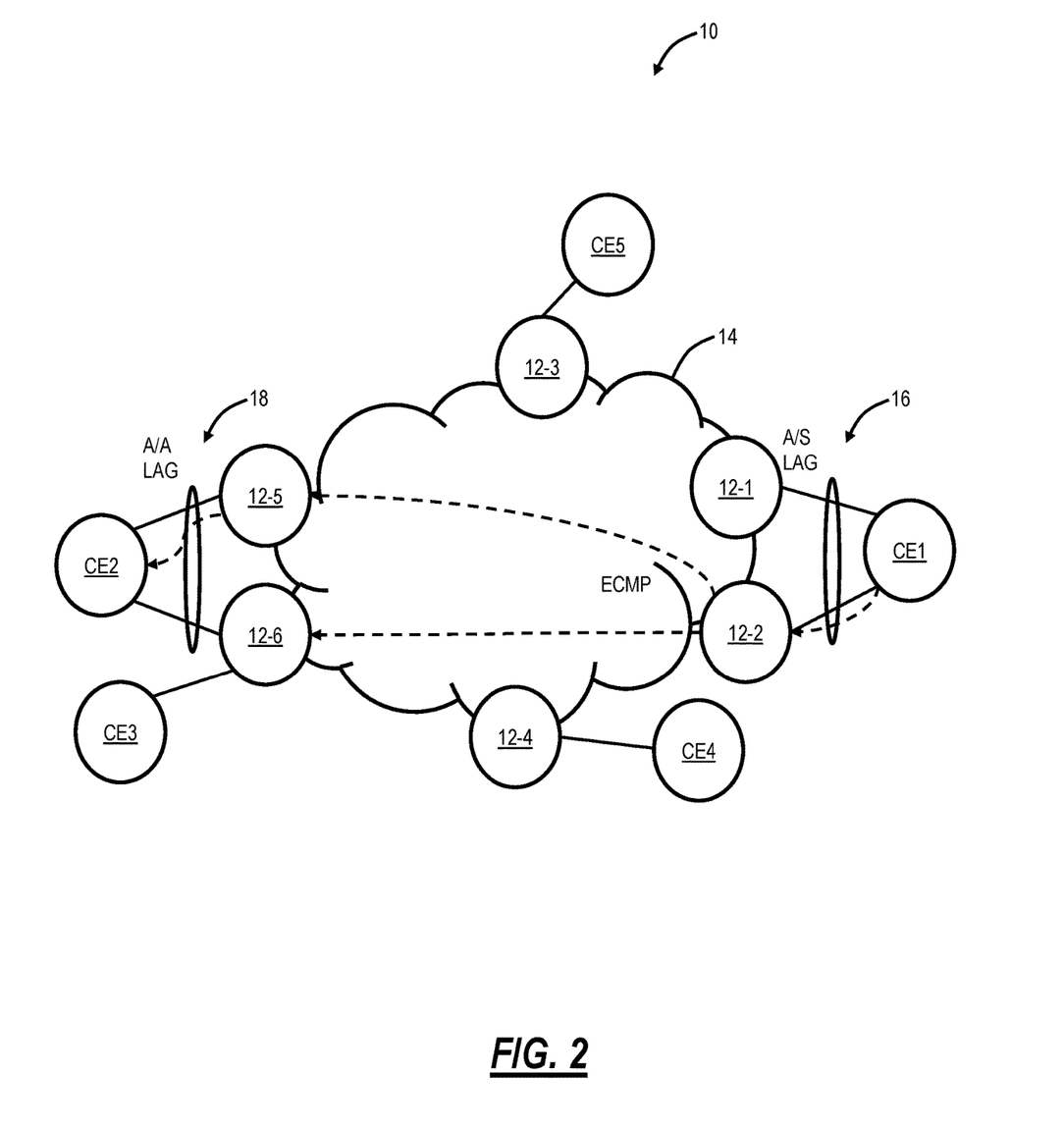
FIG. 2 is a network diagram of the example network for illustrating A/A or A/S redundancy.

FIG. 2 is a network diagram of the example network 10 for illustrating A/A or A/S redundancy. An Anycast SID per MH Site is configured on all PE routers 12-1, 12-2 and 12-5, 12-6 attached to the MH site, such as the CE routers CE1, CE2. These anycast SIDs are advertised via IGP/BGP for reachability. Each PE router 12-1, 12-2 and 12-5, 12-6 attached to the MH site, advertises the same anycast SID to allow other nodes to discover the membership (auto-discovery). L3VPN routes associated with an MH site can be advertised as a single IPv6 route containing both Anycast SID of the egress PE and service SIDs, the case of uSIDs. Multi-pathing/Fast convergence achieved using the same mechanisms used for anycast SID. A/S redundancy is the same as the A/A model except that the backup egress PE router advertises its route with a higher cost than the primary egress PE router.

SID Label Stack

The following table illustrates a SID label stack for an SR-optimized L3VPN service (with the bottom being the Layer 3 (L3) packet).

| |
| --- |
| Destination SID - could be a destination Node SID or an Anycast SID |
| Service SID |
| L3 Packet |

The SID(s) to reach destination: depends on the intent of the underlay transport:

IGP shortest path: node SID of the destination. The destination can belong to an anycast group. IGP path with intent: Flex-Algo SID if the destination can be reached using the Flex-Algo SID for a specific intent (e.g., low latency path). The destination can belong to an anycast group. SR policy (to support fine intent): a SID-list for the SR policy that can be used to reach the destination.

Service SID: The SID that uniquely identifies a L3VPN instance in an SR domain.

Multi-Pathing

Packets destined to a MH CE is distributed to the PE nodes attached to the CE for load-balancing purpose. This is achieved implicitly due to the use of anycast SIDs for both ES as well as PE attached to the ES. In FIG. 2, traffic destined to CE2 is distributed via PEs 12-5, 12-6.

Mass Service Withdrawal

On a node failure, IGP/BGP will converge. Techniques like Bidirectional Forwarding Detection (BFD) can be deployed for fast detection of failure. On PE-CE link failure, the PE node withdraws the route to the corresponding ES in BGP in order to stop receiving traffic to that ES.

With MH case with anycast SID, upon detecting a failure on PE-CE link, a PE node may forward incoming traffic to the impacted ES(s) to other PE nodes part of the anycast group until it withdraws routes to the impacted ES(s) for faster convergence. For example, in FIG. 1, assuming PEs 12-5, 12-6 are part of an anycast group, upon link failure between PE 12-5 and CE2, PE 12-5 can forward the received packets from the core to PE 12-6 until it withdraws the anycast SID associated with the MH site.

Process

Figure 3:
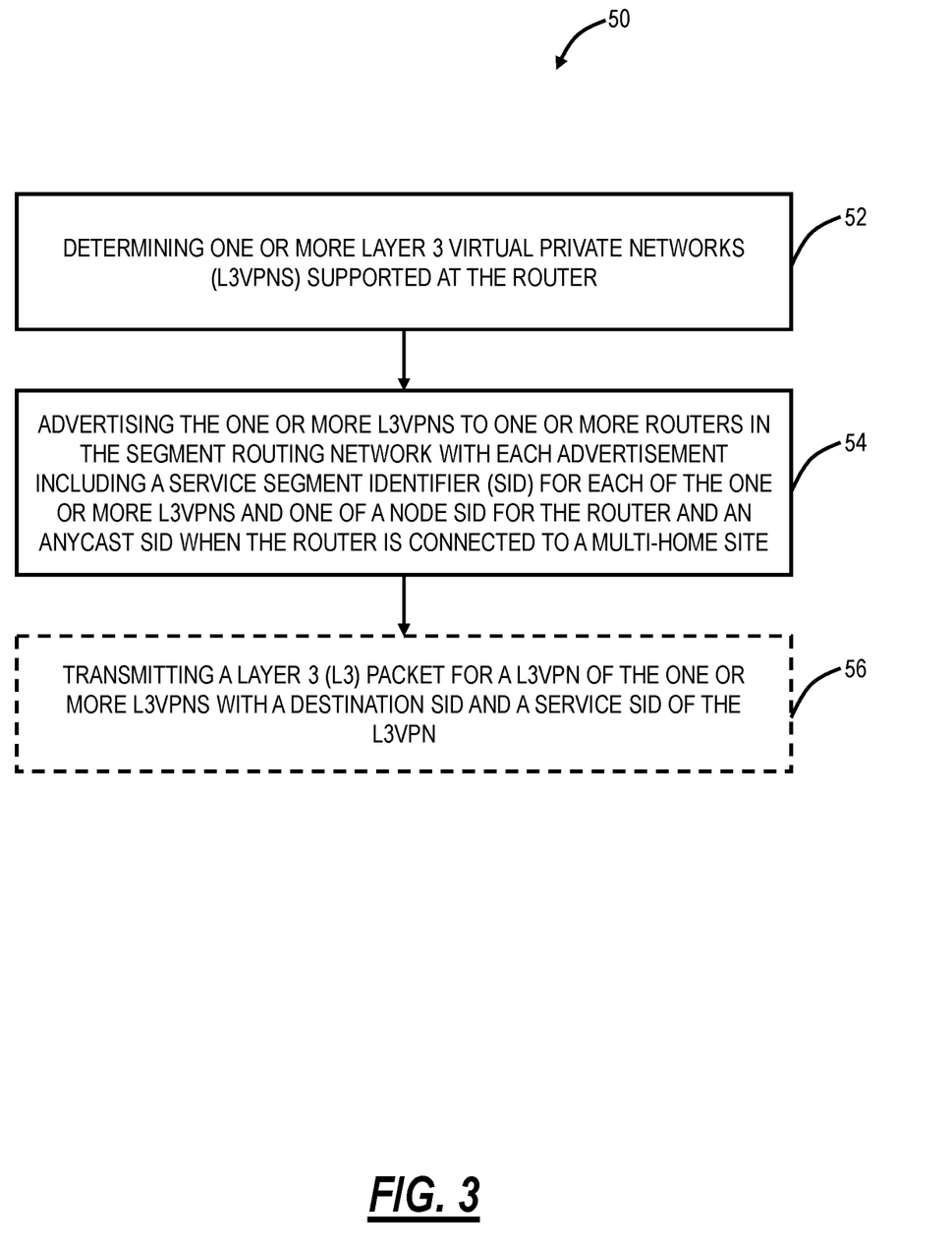
FIG. 3 is a flowchart of a Segment Routing L3VPN process.

FIG. 3 is a flowchart of a Segment Routing L3VPN process 50. The process 50 can be implemented as a method having steps, via the node 12 configured to implement the steps, and as instructions stored on a non-transitory computer-readable medium for programming a device to perform the steps.

The steps include determining one or more Layer 3 Virtual Private Networks (L3VPNs) supported at the router (step 52); and advertising the one or more L3VPNs to one or more routers in the Segment Routing network with each advertisement including a service Segment Identifier (SID) for each of the one or more L3VPNs and one of a node SID for the router and an Anycast SID when the router is connected to a Multi-Home site (step 54). The steps can also include transmitting a Layer 3 (L3) packet for an L3VPN of the one or more L3VPNs with a destination SID and a service SID of the L3VPN (step 56). The destination SID is one of a node SID for a destination router or an Anycast SID when the destination router is connected to a Multi-Home site.

The advertisement can include encapsulation as an Internet Protocol version 6 (IPv6) prefix containing both the node SID for the PE and the service SID, and wherein prefixes are treated as attributes of a route. The advertising can be via Border Gateway Protocol (BGP). The advertisement can include a plurality of L3VPN prefixes, including several thousand. This is key to reduce the control plane overhead. L3VPN prefixes, along with operation type, can be advertised via a Type-Length-Value (TLV).

Benefits

As described herein, the present disclosure supports a reduction in BGP overhead for the L3VPN control plane by two to four orders of magnitude. This eliminates the need for RDs and RTs associated with the current L3VPN architecture. This leads to operational simplicity. The present disclosure support Anycast SID provisioning, one per MH Site, for simplicity in supporting the Active-Active and Single-Active redundancy model. There is no need for any overlay support for redundancy and fast convergence and redundancy at the overlay (EVPN/BGP) layer. Of note, the Anycast SID per MH site ensures the underlay (SR) converges with no need for any overlay convergence.

Interworking

Interworking between old and new technologies is via a gateway (GW) that understands both old and new technologies. For the gateway, the interworking working function can reside on any node that can act as a GW converting control plane messages from/to old/new technologies and communicating with nodes supporting only either old or new technologies. A node 12 can support the old technologies and act as the GW to distribute the routes coming from L2VPN SAFI or EVPN to peers understanding the new technologies and vice-versa (it is bidirectional, from/to old/new), this is what EVPN did to interwork with L3VPN old SAFI stuff.

Example Node

Figure 4:
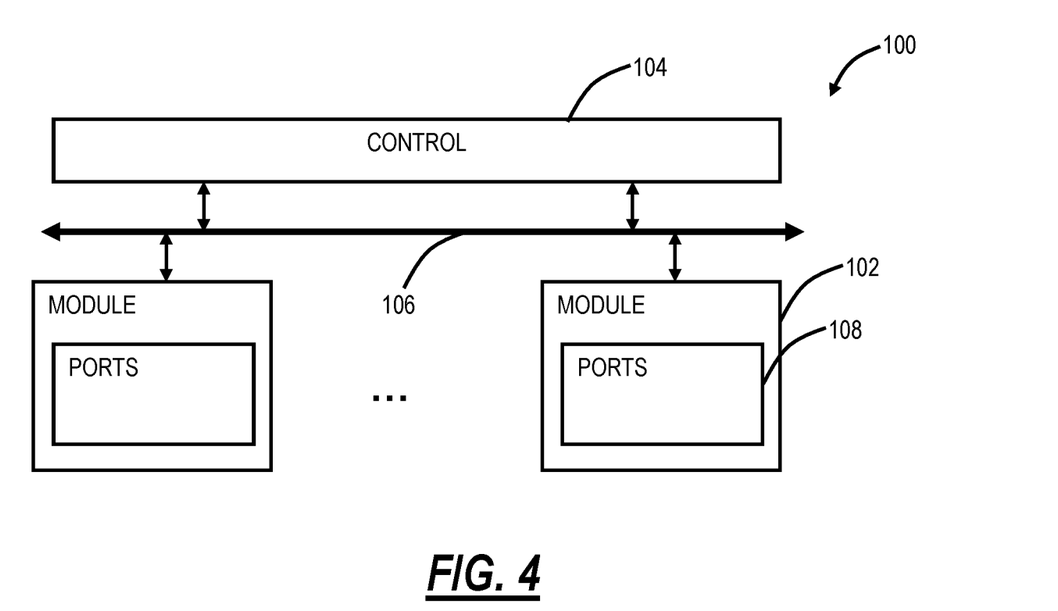
FIG. 4 is a block diagram of an example implementation of a node, such as for the node in the network and the Segment Routing network of FIGS. 1 and 2.

FIG. 4 is a block diagram of an example implementation of a router 100, such as for the node 12 in the network 10 and the Segment Routing network 14. Those of ordinary skill in the art will recognize FIG. 4 is a functional diagram in an oversimplified manner, and a practical embodiment may include additional components and suitably configured processing logic to support known or conventional operating features that are not described in detail herein.

In an embodiment, the router 100 is a packet switch, but those of ordinary skill in the art will recognize the systems and methods described herein can operate with other types of network elements and other implementations that support SR networking. In this embodiment, the router 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the router 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the router 100 out by the correct port 108 to the next router 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the router 100. The network interface may be utilized to communicate with an element manager, a network management system, the SR controller 16, etc. Additionally, the control module 104 can include a database that tracks and maintains provisioning, configuration, operational data, and the like.

Again, those of ordinary skill in the art will recognize the router 100 can include other components which are omitted for illustration purposes, and that the systems and methods described herein are contemplated for use with a plurality of different network elements with the router 100 presented as an example type of network element. For example, in another embodiment, the router 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 4 is meant to provide a functional view, and those of ordinary skill in the art will recognize actual hardware implementations may vary.

Example Controller

Figure 5:
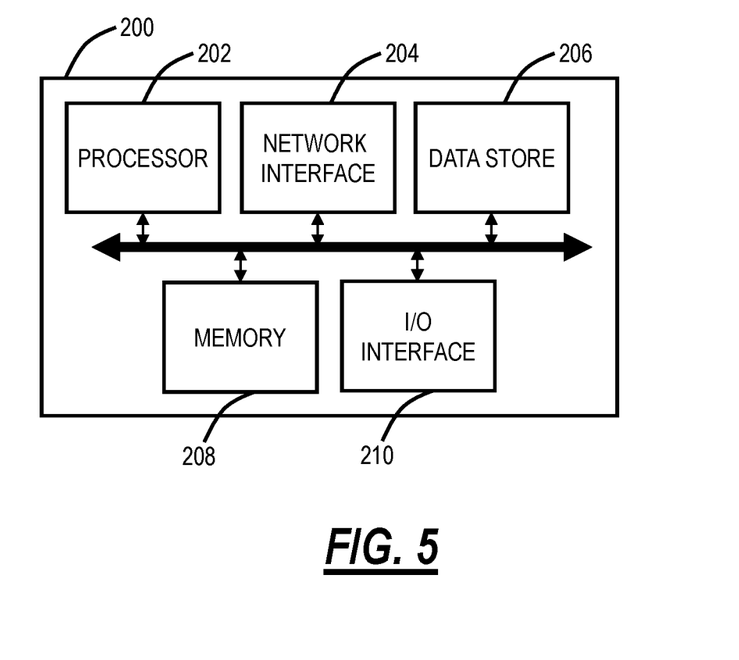
FIG. 5 is a block diagram of an example controller, which can form a controller for the node of FIG. 4.

FIG. 5 is a block diagram of an example controller 200, which can form a controller for the node 12. The controller 200 can be part of the node 12 or a stand-alone device communicatively coupled to the router 100. Also, the controller 200 can be referred to in implementations as a control module, a shelf controller, a shelf processor, a system controller, etc. The controller 200 can include a processor 202, which is a hardware device for executing software instructions. The processor 202 can be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory, to communicate data to and from the memory, and to generally control operations of the controller 200 pursuant to the software instructions. The controller 200 can also include a network interface 204, a data store 206, memory 208, an I/O interface 210, and the like, all of which are communicatively coupled to one another and to the processor 202.

The network interface 204 can be used to enable the controller 200 to communicate on a data communication network, such as to communicate to a management system, to the nodes 12, 100, and the like. The network interface 204 can include, for example, an Ethernet module. The network interface 204 can include address, control, and/or data connections to enable appropriate communications on the network. The data store 206 can store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a router in a Segment Routing network to perform steps of:
   determining Layer 3 Virtual Private Networks (L3VPNs) supported at the router; and
   advertising the L3VPNs to one or more routers in the Segment Routing network with each advertisement including a service Segment Identifier (SID) for each of the L3VPNs and one of a node SID for the router and an Anycast SID when the router is connected to a Multi-Home site, wherein the advertising includes, for the L3VPNs, a tunnel encapsulation, including the one of the node SID and the Anycast SID, as a unique route, and L3VPN prefixes of a respective L3VPN, as attributes of the unique route.

2. The non-transitory computer-readable medium of claim 1, wherein the steps further include
transmitting a Layer 3 (L3) packet for an L3VPN of the L3VPNs with a destination SID and a service SID of the L3VPN.

3. The non-transitory computer-readable medium of claim 2, wherein the destination SID is one of a node SID for a destination router and an Anycast SID when the destination router is connected to a Multi-Home site.

4. The non-transitory computer-readable medium of claim 1, wherein the advertisement includes the tunnel encapsulation as an Internet Protocol version 6 (IPv6) prefix containing both the node SID for the router and the service SID, and wherein prefixes are treated as attributes of a route.

5. The non-transitory computer-readable medium of claim 1, wherein the advertising is via Border Gateway Protocol (BGP).

6. The non-transitory computer-readable medium of claim 1, wherein the advertisement includes up to 12,000 prefixes.

7. The non-transitory computer-readable medium of claim 1, wherein the advertisement includes a plurality of L3VPN prefixes.

8. A method comprising:
determining Layer 3 Virtual Private Networks (L3VPNs) supported at a router in a Segment Routing network; and
advertising the L3VPNs to one or more routers in the Segment Routing network with each advertisement including a service Segment Identifier (SID) for each of the L3VPN s and one of a node SID for the router and an Anycast SID when the router is connected to a Multi-Home site, wherein the advertising includes, for the L3VPNs, a tunnel encapsulation, including the one of the node SID and the Anycast SID as a unique route and L3VPN prefixes of a respective L3VPN, as attributes of the unique route.

9. The method of claim 8, further comprising
transmitting a Layer 3 (L3) packet for an L3VPN of the L3VPNs with a destination SID and a service SID of the L3VPN.

10. The method of claim 9, wherein the destination SID is one of a node SID for a destination router and an Anycast SID when the destination router is connected to a Multi-Home site.

11. The method of claim 8, wherein the advertisement includes the tunnel encapsulation as an Internet Protocol version 6 (IPv6) prefix containing both the node SID for the router and the service SID, and wherein prefixes are treated as attributes of a route.

12. The method of claim 8, wherein the advertising is via Border Gateway Protocol (BGP).

13. The method of claim 8, wherein the advertisement includes up to 12,000 prefixes.

14. The method of claim 8, wherein the advertisement includes a plurality of L3VPN prefixes.

15. A router in a Segment Routing network comprising:
a plurality of ports interconnected by a switching fabric; and
a controller configured to
determine Layer 3 Virtual Private Networks (L3VPNs) supported at the router, and
cause advertisement of the L3VPNs to one or more routers in the Segment Routing network with each advertisement including a service Segment Identifier (SID) for each of the L3VPNs and one of a node SID for the router and an Anycast SID when the router is connected to a Multi-Home site, wherein the advertisement includes, for the L3VPNs, a tunnel encapsulation, including the one of the node SID and the Anycast SID, as a unique route and L3VPN prefixes of a respective L3VPN, as attributes of the unique route.

16. The router of claim 15, wherein a port is further configured to
transmit a Layer 3 (L3) packet for an L3VPN of the L3VPNs with a destination SID and a service SID of the L3VPN.

17. The router of claim 15, wherein the advertisement includes the tunnel encapsulation as an Internet Protocol version 6 (IPv6) prefix containing both the node SID for the router and the service SID, and wherein prefixes are treated as attributes of a route.

18. The router of claim 15, wherein the advertising is via Border Gateway Protocol (BGP).

19. The router of claim 15, wherein the advertisement includes up to 12,000 prefixes.

20. The router of claim 15, wherein the advertisement includes a plurality of L3VPN prefixes.

* * * * *